United States Patent [19]

Angerstein et al.

[11] Patent Number: 4,697,880

[45] Date of Patent: Oct. 6, 1987

[54] OPTICAL SYSTEM FOR PROVIDING A COLLIMATED LIGHT BEAM

[75] Inventors: Jörg Angerstein, Flein; Dieter Mutz; Elmar Wagner, both of Heilbronn, all of Fed. Rep. of Germany

[73] Assignee: Telefunken Electronic GmbH, Heilbronn, Fed. Rep. of Germany

[21] Appl. No.: 721,034

[22] Filed: Apr. 8, 1985

[30] Foreign Application Priority Data

Apr. 12, 1984 [DE] Fed. Rep. of Germany ....... 3413748

[51] Int. Cl.$^4$ ............................................... G02B 7/02
[52] U.S. Cl. .................................... 350/247; 350/252; 350/255
[58] Field of Search ........ 350/237, 245, 247, 252–253, 350/257, 320, 255; 372/101, 109; 356/73.1

[56] References Cited

U.S. PATENT DOCUMENTS

| 3,835,414 | 9/1974 | Ahearn | 372/101 |
| 3,847,469 | 11/1974 | Antes | 350/247 |
| 4,037,944 | 7/1977 | Hanson | 350/320 |
| 4,215,937 | 8/1980 | Borsuk | 356/73.1 |
| 4,365,323 | 12/1982 | Heemskerk et al. | 350/432 |
| 4,383,731 | 5/1983 | Simon et al. | 350/96.2 |
| 4,431,267 | 2/1984 | Finck et al. | 350/237 |
| 4,498,737 | 2/1985 | Doggett | 350/237 |
| 4,562,350 | 12/1985 | Thirouard et al. | 250/239 |
| 4,567,598 | 1/1986 | Noguchi et al. | 351/74 |

FOREIGN PATENT DOCUMENTS

| 97884 | 6/1983 | Japan | 372/109 |
| 220484 | 12/1983 | Japan | 372/109 |
| 204806 | 11/1984 | Japan | 350/252 |

OTHER PUBLICATIONS

Hopkins, R. E., "Some Thoughts on Lens Mounting", Optical Engineering, 9, 10–76, pp. 428–430.

Primary Examiner—William H. Punter
Attorney, Agent, or Firm—Spencer & Frank

[57] ABSTRACT

The invention relates to an optical system comprising a semiconductor laser and an optical instrument collimating the laser light. In accordance with the invention, the semiconductor laser and the optical instrument are accommodated in separate holders which are adjusted relative to one another in such a way that a criterion relating to the laser light is optimally fulfilled. After completion of the adjustment, the two holders, both forming the external housing of the entire system, are joined to one another.

4 Claims, 1 Drawing Figure

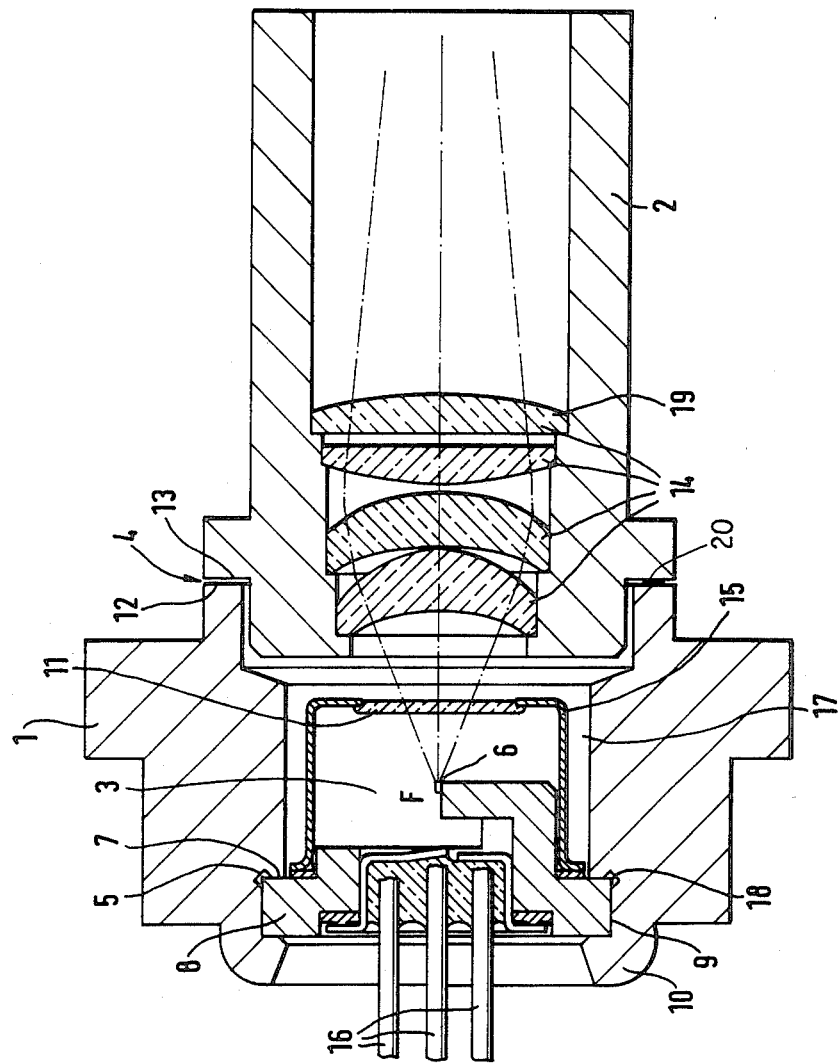

OPTICAL SYSTEM FOR PROVIDING A COLLIMATED LIGHT BEAM

BACKGROUND OF THE INVENTION

The invention relates to an optical system comprising a semiconductor laser and an optical instrument for collimating the laser light, and with a holder which is connected to the collimating optical instrument being provided for the semiconductor laser.

Semiconductor lasers emit a strongly diverging beam of rays. In the use of semiconductor lasers, it is in many cases necessary to obtain a parallel beam of rays, for example, in video long-play systems, in digital optical recordings or in optical displacement measuring apparatus based on the interferometric principle. The strongly diverging light of the semiconductor laser must therefore be corrected by a collimating optical system. In this case, the lens system must be positioned very precisely in relation to the semiconductor laser component, with the focal point of the lens system having to be set within an exactitude range of a fraction of an $\mu$m in relation to the semiconductor laser component.

An optical system of the aforementioned kind is known from the Federal Republic of Germany laid open patent application No. DE 2,734,257, in particular, FIG. 16. This principle arrangement does, however, not give any instructions for the precise setting and a suitable structural design for the system. A further optical system of the above-mentioned kind is known from the Federal Republic of Germany laid open patent application No. DE 3,142,630, in particular, FIG. 1. There, the laser component and the collimating optical instrument are accommodated, adjusted, optimized and rigidly connected by laser welding in a tube-shaped holder. This system does, however, have the disadvantage that a spring, a first adjusting ring, a further adjusting ring and a closure member are necessary, with the first adjusting ring and the closure member being rigidly connected by laser welding to the tube-shaped holder via blind hole bores. Accordingly, several parts are necessary in the assembly of the optical system, and three parts must be welded to one another.

SUMMARY OF THE INVENTION

The object underlying the invention is, therefore, to provide an optical system for a semiconductor laser which provides a collimated bundle of light, wherein only a few parts are necessary and only two parts need be rigidly connected to one another.

This object is achieved by an optical system wherein a collimating optical instrument is accomodated in a separate holder which constitutes part of the external housing of the entire system and is assembled with the holder of the semiconductor laser to form the entire system in such a way that the focal point of the collimating optical instrument is adapted to the semiconductor laser component.

In an advantageous further development, the rotational-symmetrical holders are matched and assembled when the semi-conductor laser is active, and one holder is fixed in an accommodating device, while the other holder is moved in an axial, vertical, horizontal and rotational-symmetrical direction until an optimum—with respect to the quality of the semiconductor laser light—is attained. In this adjusted state, the two holders are then fixed and joined in a materially sealed manner.

Further advantageous embodiments of the arrangement according to the invention and its manufacturing process are apparent from the subclaims.

This optical system according to the invention with a collimating optical instrument for a semiconductor laser has the essential advantage that merely two holders are required, with one of these accommodating the semiconductor laser and the other the collimating optical instrument. The two holders forming the external housing are fixed only at the point of adjustment.

BRIEF DESCRIPTION OF THE DRAWINGS

An exemplary embodiment of the invention is illustrated in the FIGURE showing the joined rotational-symmetrical holders with the semiconductor laser and the collimating optical instrument in a longitudinal section taken through the symmetry axis.

DESCRIPTION OF THE PREFERRED EMBODIMENTS

The optical system for a semiconductor laser with a collimating optical instrument, illustrated in the FIGURE, is comprised of a first rotational-symmetrical holder 1, which has a central bore 17 with different internal diameters for accommodating the semiconductor laser 3. The semiconductor laser 3 is positioned with its bottom plate 8 against a stop 7 of the internal bore of the holder 1. The housing cap 15 of the semiconductor laser 3 is hermetically sealed on the side remote from the connecting wires 16 of the semiconductor laser by a transparent plate or lens 11. The encapsulated semiconductor laser 3 and the semiconductor laser component 6 inside it are located on the symmetry axis of the holder 1 on account of accommodation in the bore 17 and fitting against the stop 7. On the one end face of the holder 1, where the connecting wires 16 are located, a rotationally-symmetrical notch or folded portion 10 on the holder 1 encompasses the bottom plate 8 of the semiconductor laser 3, whereby a hermetic sealing of the semiconductor laser is attained on the end face of the holder 1. To improve heat dissipation, holder 1 has an external diameter which is approximately twice the size of its internal diameter. This also produces a good heat conducting contact between the semiconductor laser 3 and the holder 1 via the bottom plate 8 of the semiconductor laser. At the transition point between the stop 7 in the central bore 17 of the holder 1 and the bottom plate 8 of the semiconductor laser 3, there is a groove 5 through which an external edge 18 of the bottom plate 8 extends into the free space inside the groove 5 provided therefor. In this way, the external surfaces 9 of the bottom plate 8 are positioned level with good heat transfer at the internal surfaces of the central bore 17.

Provided at the light exit side of the holder 1 is the central bore for accommodation of a further holder 2 containing a collimating optical instrument 14. Located on this side of the holder 1 is a rotationally-symmetrical stop or end surface 12 positioned against a flange 13 of the second holder 2.

The second holder 2 is likewise of rotational-symmetrical configuration and has stepped internal bores which taper against the side facing the laser exit light to accommodate a collimating optical instrument 14, whereby a certain assembly sequence for the individual lenses of the collimating optical instrument is obtained.

The external diameters of the stop 12 of the holder 1 and of the stop flange 13 of the holder 2 are of identical size in the embodiment, so that a materially sealed connection may be made at a point of adjustment 4 provided therefor between flange 13 and stop 12.

In order to generate a parallel exiting bundle of light, the focal point F of the collimating optical instrument 14 must coincide very precisely with the light emitting semiconductor laser component 6. To this end, after pre-assembly of holder 1 with the semiconductor laser 3 and pre-assembly of holder 2 with the collimating optical instrument 14, the two holders are positioned by one holder being stationarily fixed in a clamping apparatus, while the other holder is varied in its spacing and direction of rotation in a movable supporting device. The semiconductor laser is active, and the exiting light is analyzed via a light detector and converted into an analog electric signal which is fed to a control device which determines when the exiting light has, for example, minimal divergence. During this procedure, optimization of the movable part is effected in an axial, horizontal, vertical and rotational-symmetrical direction. It should be noted that adjustment of collimating optical instrument 14 and semiconductor laser component 6 must be carried out with the accuracy of a fraction of an $\mu$m. When a minimal divergence has been ascertained via the control apparatus consisting, for example, of four stepping motors and a digital control circuit, the two holders remain immovable relative to each other in their supporting devices. The two holders 1 and 2 are joined together by welding, adhesion or soldering at the point of adjustment 4. The collimating optical instrument 14 in the holder 2 is thereby joined in a materially sealed manner to the holder 1 containing the semiconductor laser 3.

The materially sealed connection at the point of adjustment 4 may also be made with a UV curing adhesive. The collimating optical instrument 14 effects correction of the aberration. The astigmatism of the semiconductor laser 3 is corrected by the cylinder lens 19 at the exit of the light ray from the optical instrument 14. The precision adjustment is effected by a rotational-symmetrical rotary motion of the movable holder section.

What is claimed is:

1. An optical system for providing a collimated light beam, comprising:
   an external housing including a first rotationally symmetrical holder having an axial bore, and a second rotationally symmetrical holder having an axial bore, with one end of said second holder extending partially into said axial bore of said first holder such that said second holder can be adjustably positioned axially, laterally and rotationally relative to said first holder when said holders are not connected, and being provided with an outwardly extending radial stop flange positioned adjacent, and having an outer diameter substantially equal to, the end surface of said first holder;
   a semiconductor laser for producing a beam of light;
   a laser housing in which said semiconductor laser is hermetically sealed, said laser housing including a bottom plate and a housing cap;
   means for fixedly mounting said laser housing in one of said first and second holders so that said housing cap is disposed within the respective said axial bore and said semiconductor laser is disposed substantially on the longitudinal axis of said one of said holders, said one of said first and second holders having an average external diameter which is approximately twice the size of its internal diameter, thereby improving heat dissipation;
   an optical instrument means for collimating the beam of light produced by said laser, said optical instrument means including a plurality of lenses, having a focal point, fixedly mounted within said axial bore of the other of said first and said second holders;
   said first and second holders are positioned relative to one another so that said focal point of said plurality of lenses coincides with said laser; and,
   means for fixedly connecting said flange on said second holder to said end surface of said first holder to maintain said relative position of said first and second holders.

2. An optical system as defined in claim 1 wherein said laser housing is mounted in said first holder.

3. An optical system as defined in claim 2 wherein said means for mounting said laser housing includes an inwardly extending radial stop formed in said axial bore of said first holder and against which the surface of said bottom plate of said laser housing which faces said second housing abuts, and means, forming part of said first holder and abutting against the opposite surface of said bottom plate, for pressing said bottom plate against said stop, whereby optimal heat contact is established between said bottom plate and said first holder.

4. An optical system as defined in claim 3 wherein said means for mounting said laser housing further includes a groove formed in the inner wall of said first holder at the transition to said inwardly extending radial stop for accomodating the external edge of said bottom plate.

* * * * *